3,346,647
PROCESS FOR PREPARING HYDROXYALKYL PHOSPHINE OXIDES

Albert Y. Garner, Yellow Springs, Ohio, assignor to Monsanto Research Corporation, St. Louis, Mo., a corporation of Delaware
No Drawing. Filed Sept. 28, 1964, Ser. No. 399,857
5 Claims. (Cl. 260—606.5)

ABSTRACT OF THE DISCLOSURE

A process for preparing a diaryl(α-hydroxyalkyl)phosphine oxide of the formula

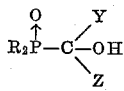

where Y and Z are alkyl by reaction of a diarylphosphinous halide with a keton in the presence of magnesium followed by hydrolysis.

---

This invention relates to organic compounds and more particularly provides a new and valuable class of hydroxyalkyl phosphine oxides and the method of preparing the same.

According to the invention, there are prepared diaryl-(α-hydroxyalkyl)phosphine oxides by reaction of a diarylphosphinous halide with and alkanone in the presence of an alkaline earth metal and subsequent treatment of the reaction product with water, substantially according to the scheme:

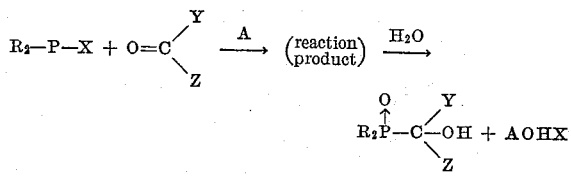

wherein R is a benzenoid radical linked to the phosphorus through nuclear carbon, free of acetylenic and olefinic unsaturation and containing from 6 to 12 carbon atoms, X is halogen having an atomic weight of above 34, Y and Z are alkyl radicals of from 1 to 4 carbon atoms, and A is an alkaline earth metal.

Diarylphosphinous chlorides which are useful in the above reaction include, e.g., diphenylphosphinous chloride, bromide or iodide, bis(2-, 3- or 4-p-tolyl)phosphinous chloride or bromide, dixylylphosphinous bromide or iodide, bis(3-hexylphenyl)phosphinous chloride or bromide, di-α- or β-naphthylphosphinous chloride or iodide, bis(o-, m- or p-biphenylyl)phosphinous chloride or bromide, or bis(o-, m- or p-cyclohexylphenyl)phosphinous chloride or iodide.

The presently useful ketones include, e.g., acetone, 2-butanone, 3-pentanone, 3-hexanone, 4-heptanone, 3-methyl-2-butanone, 4-octanone, 5-nonanone, 2,6-dimethyl-4-heptanone, etc.

Useful alkaline earth metals include magnesium, calcium, barium and strontium.

Examples of the diaryl(α-hydroxyalkyl)phosphine oxides which are provided by the present process are diphenyl(2-hydroxy-2-propyl)phosphine oxide which is obtained from diphenylphosphinous chlorine or bromide and acetone; (3-hydroxy-3-pentyl)-phenyl-p-tolylphosphine oxide from phenyl-p-tolylphosphinous chloride and 3 - pentanone; di-β-naphthyl-2-hydroxy-2-hexylphosphine oxide from di-β-naphthylphosphinous chloride and 2-hexanone; bis(n - butylphenyl)(5-hydroxy-5-nonyl)phosphine oxide from bis(n-butylphenyl)phosphinous bromide and 5-nonanone; bis(3-cyclopentylphenyl)(3-hydroxy-4-methyl-3-hexyl)phosphine oxide from bis(3-cyclopentylphenyl)phosphinous iodide and 4-methyl-3-hexanone; bis(p - biphenylyl)(2 - hydroxy-2-butyl)phosphine oxide from bis(p-biphenylyl)phosphinous chloride and 2-butanone, etc.

Reaction of the dairylphosphinous halide, the ketone and metal takes place by mixing the three reactants, allowing the resulting reaction mixture to stand at ordinary or increased temperature until the metal has been substantially consumed, and then adding water to the reaction mixture to convert it to the diaryl(α-hydroxyalkyl)phosphine oxide. Generally, the metal is mixed with the ketone and the phosphinous halide reactant in added to the mixture. Since the reaction is usually exothermic, in preliminary runs it is recommended that the phosphorus-containing reactant be added gradually, e.g. dropwise. Progress of the reaction can be followed by noting consumption of the metal. If all of the magnesium has not been used up by the time that the initial oxothermic reaction has subsided, the mixture is allowed to stand until the metal has been substantially consumed, i.e., until reaction is substantially completed. This may be accelerated by warming the mixture, if desired, to reflux. Generally, however, reaction temperatures of, say, from 15° C. to 125° C. may be employed. The nature of the reaction product which is formed by consumption of the metal is not definitely known; but it is apparently a complex which is unstable to water, for upon addition of water the reaction mixture changes from an oily liquid to a solid phase and a liquid phase. The solid phase comprises the diaryl(α-hydroxyalkyl)phosphine oxide. It can be separated from the mixture simply by filtration, and can be purified from, e.g., any unreacted, water-insoluble organic material simply by washing it with a non-solvent such as ether.

Since formation of the diaryl(α-hydroxyalkyl)-phosphine oxides takes place by participtaion of one mole of the diarylphosphinous halide, one mole of the alkanone, one-atom of the metal and one mole of water, these reactants are advantageously employed in such stoichiometric proportions. However, an excess of any of them may be used. Any unreacted metal can be filtered off from the liquid intermediate before the latter is treated with water to give the solidified hydroxyalkyl compound, and any excess of the other components can be volatilized off. Reaction of the diarylphosphinous halide with the metal and the ketone takes place in the presence or absence of an inert liquid organic solvent or diluent. Conveniently, an excess of the ketone may serve as the diluent, but an extraneous solvent or diluent may be used, e.g., ether, dioxane, dimethylsulfoxide, carbon tetrachloride, etc. An excess of water is conveniently used in the water-treating step, i.e., conversion of the liquid intermediately formed compound into the hydroxyalkyl product.

The present diaryl(hydroxyalkyl)phosphine oxides are stable, well-characterized compounds which are generally high melting, crystalline materials. They are advantageously used for a variety of industrial and agricultural purposes but are especially valuable as flame-proofing agents for natural and synthetic fibers and textiles made therefrom, e.g., cellulose, wool and other proteinaceous fibers, polyacrylonitrile, nylon, etc. They also serve as flame-proofing agents for foamed plastics such as the polyurethanes and as preignition additives for leaded gasolines.

The invention is further illustrated by, but not limited to, the following example.

Example

To a mixture consisting of 2.43 g. (0.1 mole) of magnesium metal and 100 ml. of acetone (1.36 moles) in a 500 ml. reactor and in a nitrogen atmosphere there was added, dropwise, 22.05 g. (0.1 mole) of diphenylphosphinous chloride. Immediate reaction was evidenced, with the temperature of the mixture rising spontaneously to 38° C. When all of the chloride had been added, heat was applied and the mixture was refluxed overnight. At the end of that time, the reaction mixture was filtered to remove some unreacted metal. Upon adding water to the filtrate, a white solid formed. It was filtered off and the filtrate was extracted with ether. After drying the ether extract and stripping off the ether, a white mixture of solid and liquid remained as residue. Addition of a little more ether to the residue gave a clearly defined solid. This was recrystallized from acetone/water to give the substantially pure diphenyl(2 - hydroxy-2-propyl)phosphine oxide, M.P. 134° C.–134.5° C., and analyzing as follows:

Found: C, 69.26%; H, 6.62%; P, 12.02. Calc'd for $C_{15}H_{17}PO_2$ C, 68.8%; H, 6.64%; P, 12.10%.

The infrared absorption spectrum showed P→O, P-phenyl absorption and OH absorption, agreeing with the structure.

$P^{31}$ nuclear magnetic resonance analysis was also consistent with the structure, with a peak at 8.25–7.20 p.p.m., at 3.50 p.p.m., a doublet at 1.52–1.30 p.p.m., and a $CH_3$— coupling at 13.5 cps. $H^1$ nuclear magnetic resonance showed the relative number of protons to be 10.0, 1.1 and 6.1, thus further justifying the structure:

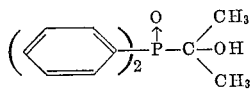

Operating as above, the use of 2-butanone instead of acetone similarly gives diphenyl(2-hydroxy-2-butyl)phosphine oxide, and replacement of the diphenylphosphinous chloride by dicumylphosphinous bromide and the acetone by 4-heptanone gives dicumyl(4-hydroxy-4-heptyl)phosphine oxide.

The present invention is not to be considered as limited by the above example, which is given by way of illustration only. It will be obvious to those skilled in the art that many modifications can be made within the spirit of the invention, which is limited only by the terms of the appended claims.

What I claim is:
1. The method which comprises mixing together (1) a phosphorus compound of the formula

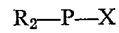

wherein R is a benzoid hydrocarbon radical linked to the phosphorus through nuclear carbon, free of acetylenic and olefinic unsaturation and containing from 6 to 12 carbon atoms, and X is halogen having an atomic weight of above 34, (2) an alkanone of the formula

in which Y and Z are alkyl radicals of from 1 to 4 carbon atoms, and (3) an alkaline earth metal, to obtain a reaction product, and subsequently contacting the reaction product with water to obtain a diaryl(α-hydroxyalkyl)phosphine oxide of the formula

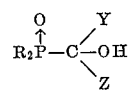

wherein R, Y and Z are as above defined.

2. The method defined in claim 1, further limited in that the alkaline earth metal is magnesium.

3. The method defined in claim 1, further limited in that the alkaline earth metal is magnesium, and R is phenyl.

4. The method defined in claim 1, further limited in that the alkaline earth metal is magnesium and Y is methyl.

5. The method which comprises contacting a mixture of acetone and magnesium with diphenylphosphinous chloride to obtain a reaction mixture and contacting said reaction mixture with water to obtain diphenyl(2-hydroxy-2-propyl)phosphine oxide.

References Cited

UNITED STATES PATENTS 3,117,165  1/1964  Epstein _____ 260—606.5
3,291,840  12/1966  Buckler et al. ____ 260—606.5

TOBIAS E. LEVOW, Primary Examiner.

W. F. W. BELLAMY, Assistant Examiner.